United States Patent [19]
Falzoni

[11] 4,266,649
[45] May 12, 1981

[54] AUTOMATIC PLAY COMPENSATION DEVICE FOR MOTOR VEHICLE CLUTCHES

[75] Inventor: Gianluigi Falzoni, Turin, Italy

[73] Assignee: Fiat Auto S.p.A., Turin, Italy

[21] Appl. No.: 26,963

[22] Filed: Apr. 4, 1979

[30] Foreign Application Priority Data

Apr. 12, 1978 [IT] Italy ............... 67808 A/78

[51] Int. Cl.³ ............................................. F16D 13/75
[52] U.S. Cl. ............................ 192/111 A; 188/196 B
[58] Field of Search ............ 192/111 A, 111 R, 70.25; 188/71.8, 196 B

[56] References Cited
U.S. PATENT DOCUMENTS

| 2,280,355 | 4/1942 | Spase et al. | 192/111 A |
| 3,250,357 | 5/1966 | Zeidler | 192/111 A |
| 3,876,049 | 4/1975 | Linn et al. | 192/111 A |

FOREIGN PATENT DOCUMENTS 1411467 10/1975 United Kingdom ............... 192/111 A

*Primary Examiner*—C. J. Husar
*Assistant Examiner*—Conrad Berman
*Attorney, Agent, or Firm*—Sughrue, Rothwell, Mion, Zinn and Macpeak

[57] ABSTRACT

A device which automatically compensates for wear of a motor vehicle clutch by the engagement, during a working stroke of a pawl end of an arm with a tooth of a locking element and subsequent disengagement of the pawl end upon the return stroke of a fork and lever due to the abutment of a stop with the arm, which allows the lever to rotate and carry the locking element out of engagement with the pawl end, a spring biasing the arm and the element together to allow the pawl end to engage a further tooth, if necessary, to compensate for wear prior to the next working stroke.

4 Claims, 3 Drawing Figures

AUTOMATIC PLAY COMPENSATION DEVICE FOR MOTOR VEHICLE CLUTCHES

DESCRIPTION

The present invention relates to an automatic play compensation device for motor vehicle clutches.

The invention is concerned with an automatic play compensation device for use with motor vehicle clutches particularly, but not exclusively, of the dry, single-plate type.

It is well known in motor vehicle clutches, for example, of the dry single-plate type, that the wear of the clutch friction linings resulting from engagement and disengagement of the clutch results in a progressively increasing degree of play between the clutch ring, the drive plate and the flywheel of the engine.

Where no provision is made to compensate for this play, the rest position of the clutch pedal, after each working stroke, will gradually rise from its original position, often by as much as 3 centimeters, as the wear increases. This presents a serious disadvantage, causing inconvenience for the driver and changing the rest position of the clutch pedal relative to the other foot pedals.

The object of the present invention is to provide a device which automatically compensates for such play in a motor vehicle clutch, caused by wear of the clutch friction linings, and thereby, prevents the aforesaid raising of the rest position of the clutch pedal.

An additional object of the invention is to provide such a device which may be quickly fitted to an existing clutch of a vehicle already in use, without altering the normal operation of the clutch mechanism, and which is of simple and lightweight construction, for advantages of economy.

According to the present invention, there is provided an automatic play compensation device for motor vehicle clutches, characterised in that it comprises a lever, attached at one end to a fork engaging a clutch release sleeve, and rotatable about a pivot axis, an arm rotatable about said axis relative to said lever, and a locking element adapted to receive an externally applied clutch-disengaging force and pivoted with the other end of the lever, such that the arm abuts a fixed stop between successive working strokes and is engaged by the locking element in a play compensating position after the lever has been displaced relative to the arm by an amount corresponding to wear in the clutch.

One embodiment of the invention will now be more particularly described, by way of example, with reference to the accompanying, purely diagrammatic drawings, in which.

Figure 1:
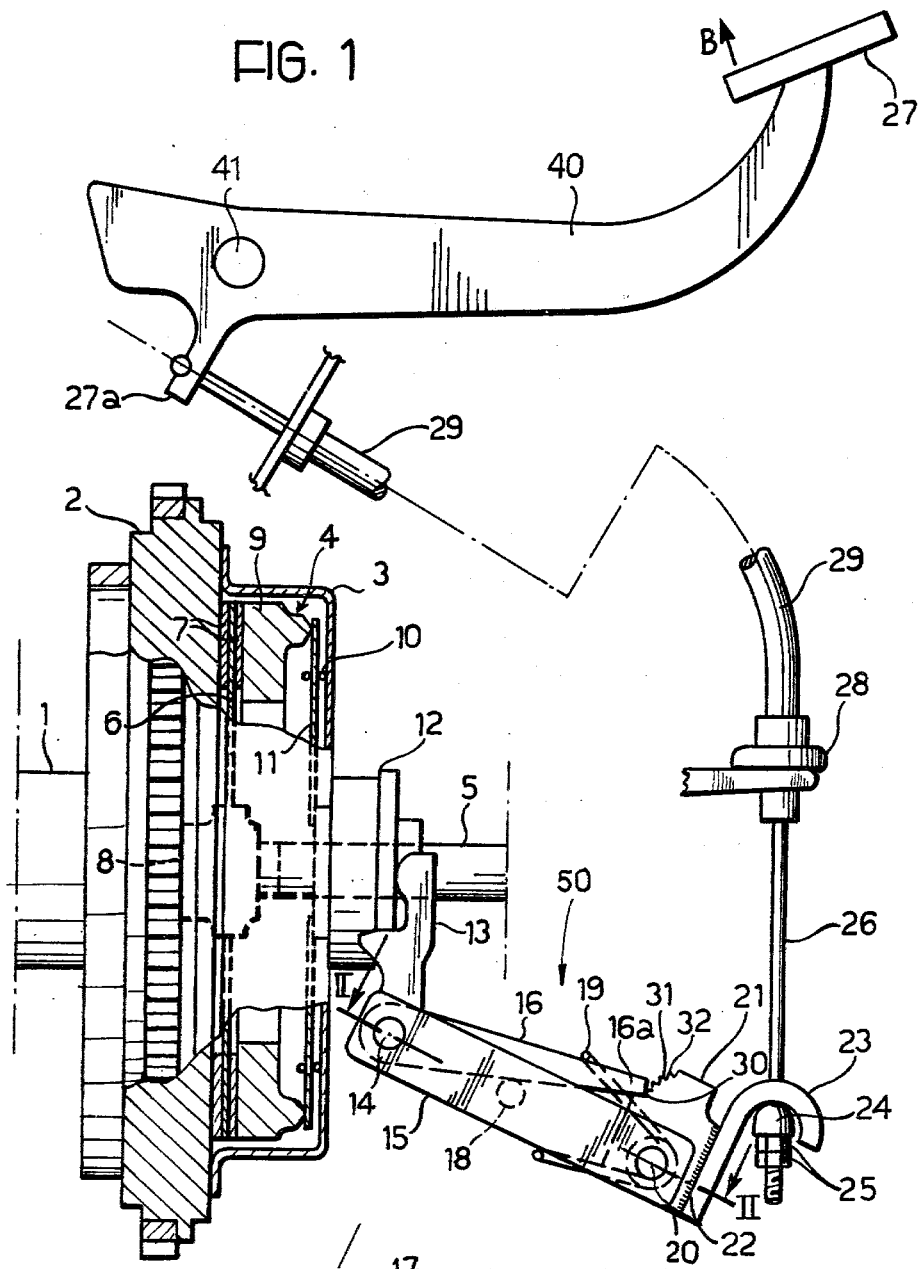
FIG. 1 is a fragmentary, partly cut-away side view of a motor vehicle clutch mechanism of a dry single-plate type incorporating an automatic play compensation device according to the invention.

Referring now to the drawings, an engine shaft 1 is connected, in a known manner to a clutch flywheel 2, which is attached to a clutchcase 3. The clutchcase 3 houses a known clutch mechanism, generally indicated 4, which controls the disconnection of the engine shaft 1 from the input shaft 5 of the gearbox (not shown).

The clutch mechanism 4 includes, in a known manner, a drive plate 6 faced on both sides by a respective friction lining 7 and attached, by a central bore, to a hub 8 which has a splined coupling with the gearbox input shaft 5. The drive plate 6 is pressed between the flywheel 2 and a clutch ring 9 by an annular disc spring 11 which abuts, at its inner periphery, one end of a moveable clutch release sleeve 12 carried on the gearbox input shaft 5. The spring 11 acts at its outer periphery against the clutch ring 9, pivoting about radially located fulcrum members 10 to urge the clutch mechanism 4 into an engaged position (shown in FIG. 1) and effect the connection of the engine shaft 1 and the gearbox input shaft 5. A fork 13, which abuts the other end of the sleeve 12, causes a translational movement of the sleeve 12 towards the hub 8 when a clutch pedal 27 is depressed by the driver's foot in a working stroke. This movement of the clutch release sleeve 12 on the gearbox input shaft 5 causes the spring 11 to disengage the clutch ring 9 from the drive plate 6 and, thus, disconnect the engine shaft 1 from the gearbox input shaft 5, that is, disengage the clutch.

The clutch pedal 27 is attached to one end of a lever 40, comprising the clutch control lever, and receives a clutch disengaging force from the driver's foot which causes the pedal lever 40 to rotate downwardly (as shown in the drawings), in a working stroke, about a pivot 41 and pull a clutch-disengaging force transmitting element, comprising a Bowden cable 26. The cable 26 is enclosed for most of its length in a flexible sheath 29 fixed at opposite ends to the vehicle body. One end of the cable 26 is anchored to a lug 27a on the pedal lever 40, and the other end is attached to an automatic play compensating device, generally indicated 50, which interconnects the cable 26 and the fork 13. Thus, depressing the pedal lever 40 causes the aforesaid movement of the sleeve 12.

Figure 2:
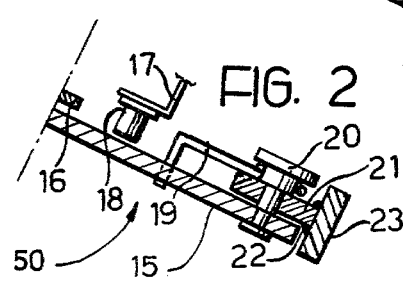
FIG. 2 is a partial section taken along the line II—II of FIG. 1.

The automatic play compensating device 50 comprises a coupling lever 15 which, together with the lower end of the fork 13, is keyed at one end to a pivot pin 14 for rotation with the pin; the fork 13 and the lever 15 being fixed relative to each other. An arm 16 is rotatably mounted at one end on the pin 14, between the fork 13 and the lever 15, for rotation relative the fork and lever. A stop 18 is mounted on a bracket 17 fixed to the gearbox housing (not shown) to limit the rotation of the arm 16. The arm 16 tapers towards its other end to form a pawl end 16a which engages a respective tooth 30, 31, 32 of a locking element 21 pivoted at the other end of the lever 15 by a pivot pin 20 (see FIG. 2). The pawl end 16a and a respective tooth 30, 31, 32 are maintained in engagement by a hairpin spring 19 which is carried by the pin 20 and urges the arm 16 and the locking element 21 together.

An arcuate bracket 23 is welded to the locking element 21, on its end 22 opposite the teeth 30, 31, 32 and retains the respective end of the cable 26 by means of a plastics plug 24, carried on said end and having a rounded surface which engages the bracket 23, and a locking nut 25 (see FIG. 1).

The device operates as follows: when the pedal lever 40 is depressed in a working stroke, the cable 26 is tensioned causing a rotation of the locking element 21 which firmly engages with the pawl end 16a of the arm 16, and effectively locks the locking element 21 to the lever 15. The lever 15 and the fork 13 then rotate upwardly (as seen in the drawings) about the pivot pin 14 to cause a translational movement of the clutch release sleeve 12 and disengagement of the clutch, as described above.

Figure 3:
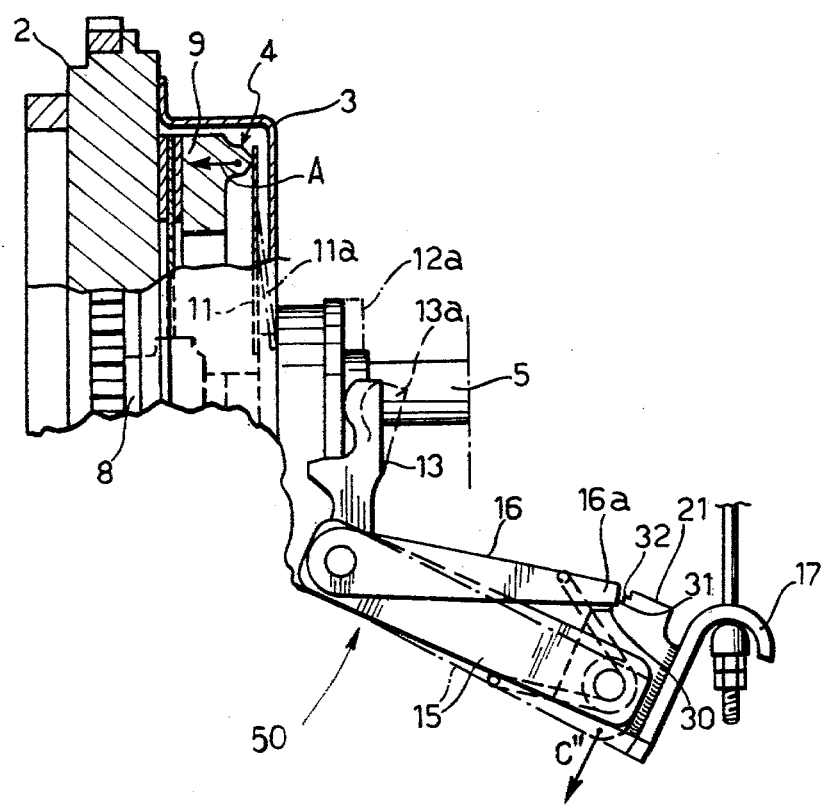
FIG. 3 is a view similar to FIG. 1 showing the essential elements of the clutch mechanism in a position in which the play has been compensated.

During use over a period the friction linings 7 will become worn causing a displacement of the clutch ring 9 towards the drive plate 6. This displacement, indicated by arrow A in FIG. 3, results in an excessive bowing 11a of the spring 11, as shown in FIG. 3, which, in turn, axially displaces the clutch release sleeve 12 and the fork 13 into new positions 12a, 13a respectively, corresponding to the wear of the friction linings 7. These displacements would result in the rest position of the pedal lever 40 rising in the direction of arrow B in FIG. 1 after subsequent working strokes, in the absence of the compensating device 50.

When the driver's foot is removed from the pedal 27, the cable 26 relaxes, allowing the pedal lever 40 to return to its rest position. The spring 11 pushes the clutch release sleeve 12 back, in a return stroke, causing rotation of the fork 13 and the device 50 in a direction opposite to that described above. The stop 18 prevents continued rotation of the arm 16 leaving the fork 13 and lever 15 free to rotate, in the direction of arrow C in FIG. 3, through an angle corresponding to the displacement of the clutch release sleeve 12 due to the wear of the friction linings 7. The rotation of the lever 15 causes the pawl end 16a of the arm 16 to disengage from its respective tooth 30, 31, 32 on the locking element 21, against the action of the spring 19, and as the displacement of the sleeve 12 is taken up by the rotation of the lever 15, the pawl end 16a of the arm 16 re-engages with one of the teeth 30, 31, 32 of the locking element to maintain the new relative angular position of the fork 13 and lever 15 for subsequent working strokes.

The relative angular displacement of the lever 15 and the locking element 21 compensates for the play and maintains a constant rest position for the pedal lever 40. An automatic play compensation device constructed in the manner described above has a simplicity of construction of operation due to a reduced number of component parts. The device ensures that the rest position of the clutch pedal remains constant, without affecting the efficient operation of the clutch and thereby, avoids the necessity of adjusting the clutch during the lifetime of the friction linings.

What is claimed is:
1. Automatic play compensating device for a motor vehicle clutch including:
   a clutch control lever which effects a working stroke upon the application of a clutch-disengaging force thereto;
   means for transmitting said force;
   a fork operable by said control lever through said means, and
   a clutch release sleeve engaged by said fork;
   wherein said play compensating device comprises in combination:
   a coupling lever attached at one end to said fork;
   means supporting said coupling lever for pivotal movement about a pivot axis at said one end;
   an arm rotatable about said axis relative to said coupling lever;
   fixed stop means for limiting the rotation of said arm between successive working strokes of said clutch control lever;
   a locking element operably connected to said clutch control lever;
   pivot means for pivotally connecting said locking element on the other end of said coupling lever in adjustable engagement with said arm during a working stroke of said clutch control lever;
   said locking element being disposable in different angular positions relative to said coupling lever dependent upon the displacement of said coupling lever which corresponds to clutch wear; and
   resilient means adapted to urge said arm into engagement with said locking element.
2. Device as defined in claim 1, wherein one end of said arm forms a pawl which is urged into engagement with a respective tooth of a toothed portion of said locking element by said resilient means.
3. Device as defined in claim 2, wherein said resilient means are mounted on said pivot means connecting said locking element and said coupling lever.
4. Device as defined in claim 1, wherein said locking element is connected to one end of said means for transmitting said force by an arcuate bracket on the locking element which engages a rounded surface on a plug carried at said end of said force transmitting means, the other end of which is connected to said clutch control lever.

* * * * *